UNITED STATES PATENT OFFICE.

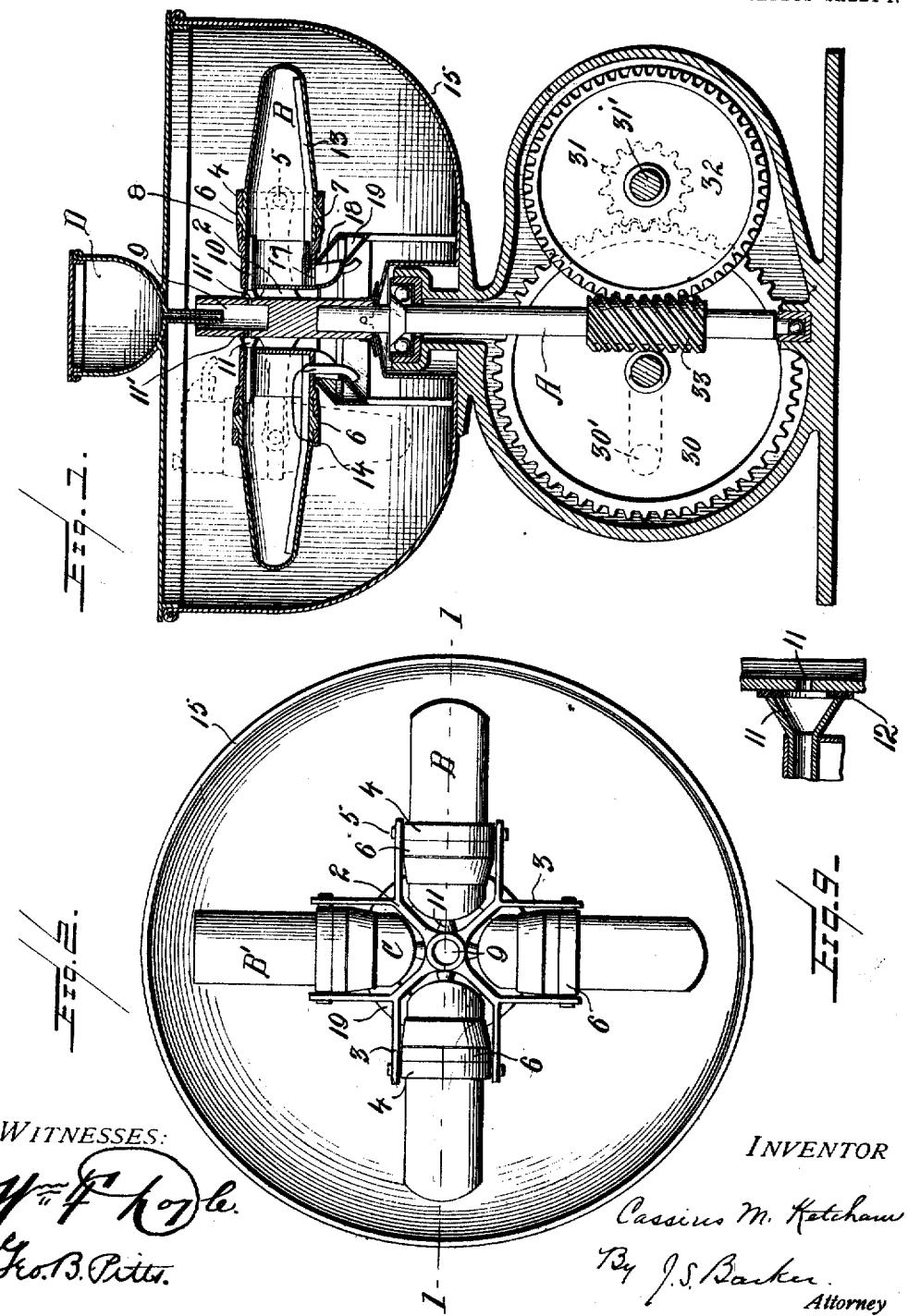

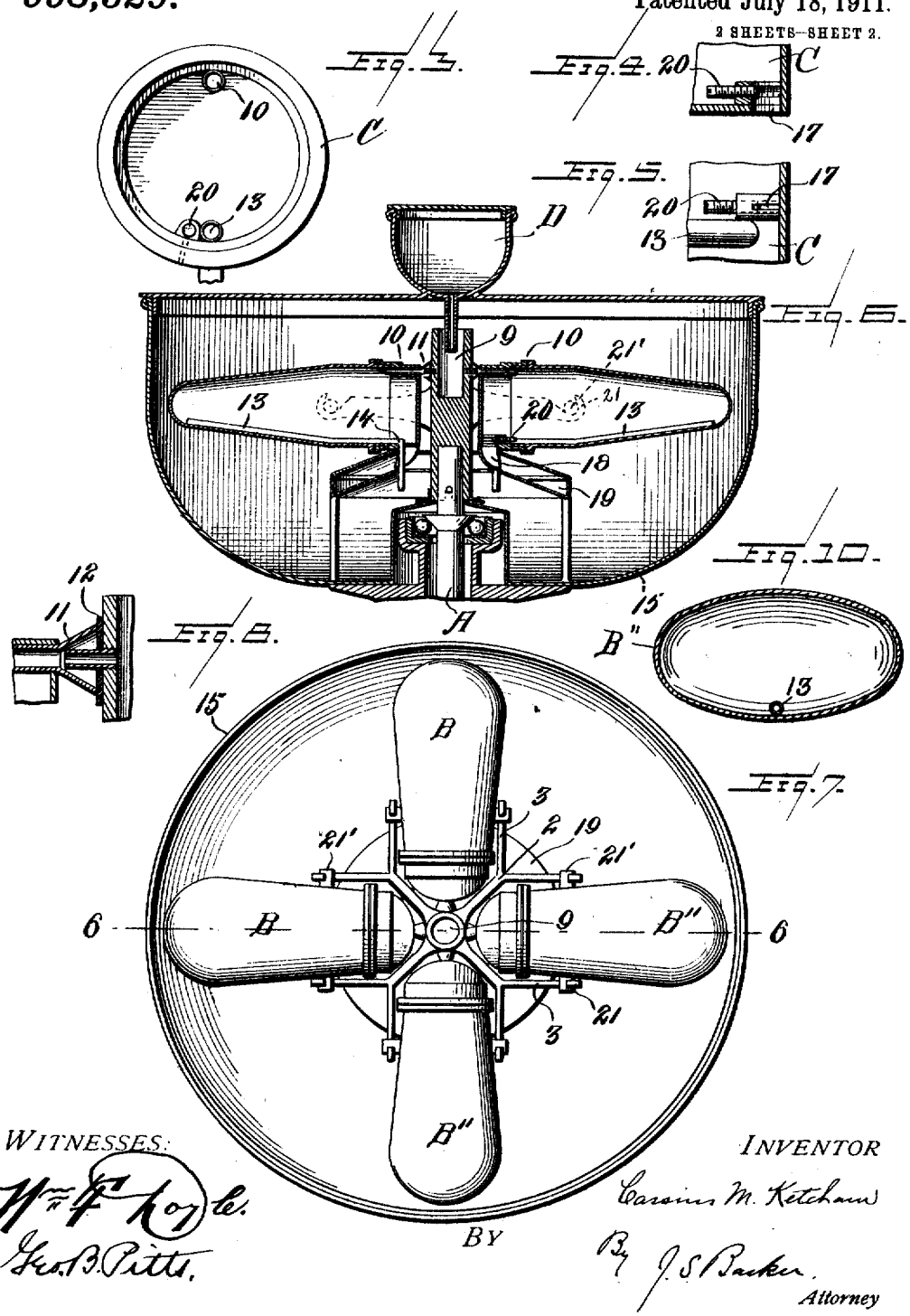

CASSIUS M. KETCHAM, OF CARTHAGE, MISSOURI.

CENTRIFUGAL CREAM-SEPARATOR.

998,529. Specification of Letters Patent. Patented July 18, 1911.

Application filed July 12, 1906. Serial No. 325,876.

*To all whom it may concern:*

Be it known that I, CASSIUS M. KETCHAM, a citizen of the United States, residing at Carthage, in the county of Jasper and State of Missouri, have invented a new and useful Improvement in Centrifugal Cream-Separators, of which the following is a specification.

My invention relates to cream separators and particularly to that class of apparatus known as centrifugal separators.

It has for its object to produce an improved machine of this character.

In the accompanying drawings Figure 1 is a vertical section of a machine embodying the principles of my invention taken on the line 1—1 of Fig. 2, the position assumed by the parts when the machine is in motion being represented in full lines. Fig. 2 is a top plan view thereof. Fig. 3 is a view of the interior of the cap. Figs. 4 and 5 are detail views of the cream discharge passage. Fig. 6 is a vertical sectional view of a different form of my invention taken on the line 6—6 of Fig. 7. Fig. 7 is a top plan view of the form of the apparatus shown in Fig. 6. Fig. 8 is a detail sectional view of the connection between reservoir and separator. Fig. 9 is a detail view of the connection between the milk reservoir and separator in the form of the invention shown in Figs. 1 and 2. Fig. 10 is a section on the line 10—10 of Fig. 7.

In the accompanying drawings, A represents the main shaft, which is preferably arranged vertically and is adapted to be driven at a high speed by any suitable mechanism. The mechanism shown consists of a gear wheel 30 driven by a crank 30'. The gear wheel 30 is adapted to mesh with a pinion 31 mounted on a shaft 31', to which latter is secured a gear wheel 32, which in turn meshes with the spiral or worm pinion 33 on the main shaft A.

I do not wish to be limited to the mechanism I have just described, and which is illustrated in the drawings, although that shown is well adapted for the purposes of my invention.

Upon the upper part or end of the shaft A there is mounted a revolving frame that is constructed to support and carry the receptacles into which the milk is delivered for separation by centrifugal action developed by the rapid rotation of the apparatus. The frame shown is arranged to support four cups or separating vessels. It might, however, be arranged to support three, or two, or even one. The latter, while practically embodying my invention, would not be as desirable an arrangement, and provision would have to be made to counterbalance the milk vessel in order to insure steady working of the apparatus. The frame shown in Figs. 1 and 2 is adapted to support a series of removable separating vessels that are adapted when the machine is at rest to stand in a vertical position as indicated in dotted lines in Fig. 1, but under the action of centrifugal force to be thrown out into substantially horizontal position when the machine is in operation. When thus thrown out into working position the vessels are radially disposed to the axis of rotation of the revolving frame. The frame consists of a central spider-like part 2 adapted to be set upon or coupled to the end of the shaft A. This spider-frame is provided with arms 3, in each pair of which is mounted a supporting ring 4, the ring being free to turn upon its pivots 5.

B indicates as a whole one of the removable cups or vessels in which the separation of the cream from the milk takes place. It is preferably formed of pressed or drawn metal, such as steel, copper or brass, and is provided with an external flange or shoulder 6, adapted to sit upon the ring 4. In order to lessen the resistance of the air as the vessel revolves, I preferably flatten the body thereof, horizontally, as indicated in Figs. 7 and 10. This is not essential, though desirable, and at B' I have indicated a vessel cylindrical in cross-section and not having a flattened end.

The inner end of each cup or vessel B is preferably open. This makes a vessel of one piece, and hence without joints, that can be freely opened, thus rendering its cleansing easy, an advantage that will at once be apparent to those using apparatus of this character, and to the public in general.

The open end of the vessel is closed by a cap or closure which I have designated as a whole by the letter C. It fits tightly over a flange 7 at the end of the cup and against the rim or shoulder formed by the inner edge of the flange 6. A packing ring or gasket 8 may be placed between the edge of the cap and the rim to prevent leakage. It will be apparent that when the apparatus is in operation the centrifugal force incident to the rapid rotation of the moving parts will tend to close the cap upon the end of the vessel so tightly as to prevent the possibility of any leakage. This makes an exceedingly efficient, as well as simple, method for closing the cup liquid-tight during operation. As soon as the apparatus comes to rest the cups can be easily removed, there being no locking means for holding them in place.
The milk to be separated is fed from a suitable reservoir or tank, such as indicated at D, to a well or conduit 9 formed in the revolving frame. This is preferably located at the center of the frame, and from it each of the vessels B receives its supply. The fluid connection or conduit between this well 9 and the vessel B is of such character that it is established when the vessel is brought into working position, and is broken when the vessel is removed from the apparatus or assumes an upright position. One part of this connection is preferably carried by the cap portion C of the separating vessel and consists of a tube 10, provided with a flaring or funnel-shaped end 11 arranged outside the end of the cap. This flaring end of the tube comes opposite to an aperture 11' through the wall of the milk receptacle or well 9, when the receptacle is in place and in working position, so that there is a free conduit from the well to the vessel comprising the aperture 11', the funnel-shaped end 11 of the tube and the main body portion 10 thereof extending through the cap and opening at a suitable point,—preferably near the inner end—into the cup or vessel B. An elastic packing might be arranged about the aperture 11' against which the end 11 of the tube may bear, as indicated at 12, see Fig. 9. The end of that portion of the conduit through which the milk passes in traveling from the well 9 into the separating vessel which is in the revolving frame, is so disposed that it is entirely to one side of the path of any part of the separating vessel as it swings from a vertical to a horizontal position, or vice versa, so that it can in no way interfere with the free movements of the vessel, while at the same time its position is such that the conduit is automatically completed as the separating vessel assumes its horizontal position, and is automatically broken as it swings therefrom toward its vertical position.
The delivery means for the milk, that is the means through which the cream and the skimmed milk, respectively, pass out of the cup or vessel B are carried by the cap C. I prefer that the means for delivering the skimmed milk should consist of a comparatively long tube 13 secured to the cap and extending into the cup. It is of length sufficient to bring its outer open end nearly to the outer end of the cup, as indicated in Figs. 1 and 6. The other end of the tube is open and carried through the wall of the cap, as indicated at 14, where it is arranged to deliver into the skimmed milk pan 15. The cream, which collects at the inner end of the separator, that is at the end over which the cap C fits, passes out through a slot or passage 17 formed in the wall of the cap. This discharge passage is provided with a shield 18 arranged to direct the cream into the pan 19 where it is collected. The outlet through which the cream is delivered may be provided with any suitable means for adjusting its size or position. I have represented a screw-adjusting device for this purpose at 20, preferably arranged on the inside of the cap C.

With this description of the apparatus, its method of operation may be stated. When the parts are at rest the several vessels B stand vertically, but as soon as the frame is rapidly rotated, centrifugal force causes them to fly outward until they assume substantially horizontal positions. Two results follow this change in the position of the vessels B. In the first place the connections between the vessels and the milk well 9 are established, and in the second place the cups are sealed, the caps being held liquid-tight against the body of the separators. The parts having assumed their working positions the milk is fed into the well 9 and passes therefrom into the several separators which upon becoming full, discharge their contents, the cream passing into the pan 19 and the skimmed milk into the pan 15. It will be understood that the rapidity with which the milk flows from the receptacles depends entirely upon the feed to the supply well 9, and that the thoroughness of separation depends upon the length of time consumed in passing a body of milk sufficient to fill a separator or vessel B through the same. When the apparatus is to be brought to rest the supply of milk is stopped, and then the moving parts are gradually slowed down until they finally stop, when the several cups will assume an upright position. They will be filled, but can be easily removed and emptied and cleansed.

In Figs. 6 and 7 I have shown a form of apparatus in which the separators do not swing. They are separable, but when in place at once assume a substantially horizontal position. In this form of my invention I prefer that the arms 3 of the revolving frame should be provided with hooks 21 adapted to engage with arms 21' extending outward from the sides of the separators. When a cup is put in place the liquid connection between the well 9 and the interior of the separator B is established. It will be understood that when an apparatus of this character comes to rest, after having been used, the milk will drain from the separators into the pans, and they will be substantially empty when removed from their supporting frame. In this form of the invention, in order to increase the capacity of the separating vessel, I prefer to widen it at its outer end, as shown at B'', Fig. 7. By flattening the vessel vertically and widening it horizontally the capacity thereof is not decreased, as compared with a vessel cylindrical throughout its entire length. In most respects this form of my apparatus is similar to that shown in Figs. 1 and 2, and further description is deemed unnecessary.

What I claim is:

1. In a cream separator, the combination of a frame, means for rotating it at a high speed, a separating vessel mounted in the frame and free to swing into a substantially horizontal position when the frame is rapidly rotated, and a conduit for conveying a fluid from a source of supply to the separating vessel comprising portions carried respectively by the rotating frame and the separating vessel and arranged to be automatically brought together to form a liquid-tight connection as the vessel assumes a horizontal position under the action of centrifugal force and to automatically separate as the vessel falls from such substantially horizontal position, the end of that part of the conduit which is carried by the frame being entirely out of the path of any part of the vessel as it swings toward or away from its substantially horizontal position.

2. In a cream separator, the combination of a rotating frame, a separating receptacle therein carrying a closure, a liquid conduit, and substantially liquid tight connections between the conduit and receptacle extending through the said closure.

3. In a cream separator, the combination of a rotating frame, a swinging receptacle mounted therein and arranged to assume an outwardly extended position under the action of centrifugal force, a closure for the receptacle, a liquid conduit, and substantially liquid tight connections between the receptacle and the conduit arranged to automatically register as the receptacle swings into its outwardly extended position.

4. In a centrifugal creamer, the combination of a revolving frame, a separating receptacle mounted therein and extending outward from the center of rotation, a conduit carried by the frame for receiving the milk, a closure for the receptacle, and a connection between the receiving conduit and the receptacle carried by the closure and arranged to serve as a liquid-tight conduit between the two when the receptacle is in working position.

5. In a centrifugal creamer, the combination of a revolving frame, a receptacle mounted therein and extending outward from the center, a conduit carried by the frame of the machine for receiving the milk, a connection between the said conduit and the receptacle, and two discharge passages arranged near one end of the receptacle, one for the cream and the other for the skimmed milk.

6. In a centrifugal creamer, the combination of a rotary frame, a receptacle mounted therein and arranged to normally hang in a substantially vertical position and when the frame is in rotation to swing into a horizontal position, a milk conduit carried by the frame, connections between the conduit and the receptacle arranged to be automatically brought together when the cup comes into horizontal position and to automatically separate when the frame comes to rest and separate discharge passages for carrying off the skimmed milk and cream respectively.

7. In a centrifugal creamer, the combination of a rotating frame, a swinging receptacle mounted therein and arranged to stand outward from the center of rotation when the frame is revolved, having the body part thereof flattened horizontally, means for delivering milk to the receptacle, and means for conveying therefrom the cream and the skimmed milk.

8. In a centrifugal liquid separator, the combination of a frame and means for rotating said frame, a series of receptacles arranged concentrically about said frame, a reservoir carried by the frame, connections between the reservoir and each of the said cups for feeding the liquid thereto, and two discharge passages for each receptacle for carrying respectively the skimmed milk and cream.

9. In a centrifugal liquid separator, the combination of a frame and means for rotating said frame, a series of independent liquid separating receptacles arranged concentrically about said frame, a reservoir carried by the frame, connections between the reservoir and each of the said receptacles for feeding the liquid thereto, and two discharging passages for each receptacle for carrying respectively the skimmed milk and cream.

10. In a centrifugal liquid separator, the combination of a rotatable frame, a pair of arms secured thereto, a removable vessel swingably mounted between the said arms, arranged to occupy a vertical position when the frame is at rest but to swing into a substantially horizontal position when the frame is rotated, the outer portions of the said vessel being flattened in cross-section, a reservoir mounted in the frame for receiving milk, connections between the said reservoir and the vessel arranged to register with each other when the said vessel is swung into a substantially horizontal position, and independent discharge passages for the separated parts of the milk.

11. In a centrifugal cream separator, the combination of a revolving frame, a pair of arms connected thereto, a removable vessel mounted in said arms, a reservoir for the milk mounted in the frame, connections between the reservoir and said vessel for supplying the latter with milk, a cap for closing the end of said vessel, independent discharge passages for the separated parts of the milk, located in said cap, and a tube leading from the outer end of the vessel to one of the discharge passages in the cap.

12. In a centrifugal liquid separator, the combination of a frame and means for rotating said frame, a pair of arms secured to said frame, a ring pivotally mounted therein, a separator vessel mounted in said ring, a reservoir mounted in the frame, connections between the reservoir and vessel for feeding the milk thereto, and discharge passages for the separated parts of the milk.

13. In a centrifugal milk separator, the combination of a revoluble frame, a vessel for containing milk extending outward therefrom, a cap for closing said vessel, a supply reservoir for the milk mounted in the revoluble frame, connections carried by the cap for conveying the milk from the reservoir to the vessel, and two discharge passages for the separated parts of the milk also mounted in the said cap.

14. In a centrifugal milk separator, the combination of a rotating frame, a vessel mounted therein and extending outward therefrom, a reservoir for the milk mounted in the frame, connections between the reservoir and the vessel for feeding the milk thereto, a discharge passage for the cream located in one end of the vessel, a discharge passage for the skimmed milk located in close proximity to the discharge passage for the cream, and a tube extending from the discharge passage for the skimmed milk nearly to the opposite end of the said vessel for conveying the skimmed milk thereto.

15. In a centrifugal milk separator, the combination of a rotating frame, a pair of arms secured thereto, a ring pivotally mounted between the said arms, a vessel provided with a shoulder arranged to rest on the said ring, the said vessel arranged to stand in a vertical position when the machine is at rest, but to swing into a substantially horizontal position when the frame is rotated, the vessel being flattened in cross-section, a milk reservoir mounted in the frame, connections between the reservoir and the vessel arranged to register with each other when the said vessel is thrown into a substantially horizontal position, a discharge passage located in one end of said vessel for discharging the skimmed milk, a tube leading from the opposite end of the vessel for conveying the skimmed milk thereto, and a discharge passage for the cream.

In testimony whereof I have signed my name to this specification in the presence of two subscribing witnesses.

CASSIUS M. KETCHAM.

Witnesses:
E. B. RATCLIFFE,
GEO. B. PITTS.

Copies of this patent may be obtained for five cents each, by addressing the "Commissioner of Patents, Washington, D. C."